Oct. 12, 1926.  
J. C. McLEAN  
1,603,241  
EXPANSION COUPLING  
Filed Nov. 25, 1925

INVENTOR.  
John C. McLean  
BY  
Fay, Oberlin + Fay  
ATTORNEYS

Patented Oct. 12, 1926.

1,603,241

UNITED STATES PATENT OFFICE.

JOHN C. McLEAN, OF CLEVELAND, OHIO.

EXPANSION COUPLING.

Application filed November 25, 1925. Serial No. 71,366.

The present invention relates to expansion couplings adapted to be mounted in the walls of vessels and having a suitable means for connection with a pipe or conduit so as to connect the latter with the interior of the vessel. The present device provides a small tightly fitting unit for attachment to vessel walls, and this may be done by merely drilling a hole of suitable diameter in the wall. Means are also provided whereby the device may be attached to cylindrical and spherical walls as well as flat walls without special equipment. The device not only expands securely in place, but automatically draws itself snugly against the wall, thus providing a tight seal which does not leak. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
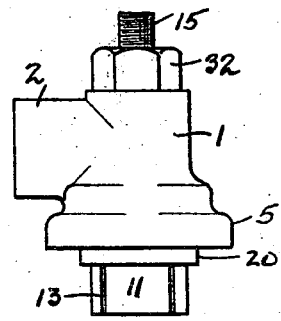
Figure 2:
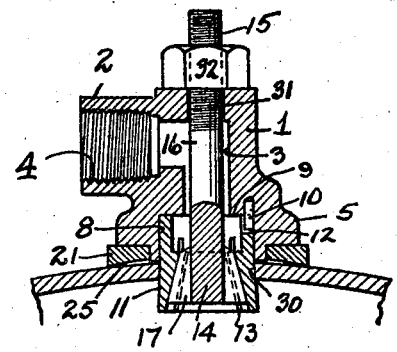
Figure 4:
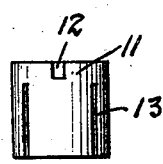
Figure 3:
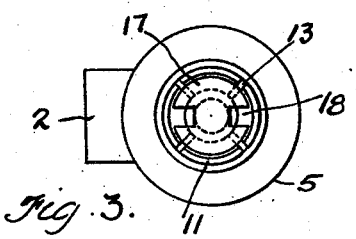
Figure 5:
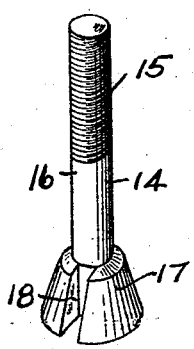

Fig. 1 is a side elevational view of the coupling; Fig. 2 is a sectional view through the coupling; Fig. 3 is an end elevation of the device; Fig. 4 is an elevational view of the expanding cylinder; Fig. 5 is a perspective view of the expanding bolt; and Fig. 6 is a view similar to Fig. 2 but showing a coupling for a flat wall surface.

The present coupling consists of a hollow member 1 having a laterally extending hollow boss 2 communicating with the interior bore 3, the boss being internally threaded as at 4, as shown in Fig. 2 or being provided with any suitable pipe connecting means.

The member 1 has an enlarged lower bore 8 forming an annular shoulder 9 in which is mounted a pin or stop 10 and an expanding sleeve 11 is employed, this sleeve fitting fairly snugly in the enlarged bore 8 and having a slot 12 adapted to receive the pin 10 to prevent rotation of the sleeve. The sleeve is slotted as at 13 and the lower interior portion is cone-shaped to provide a conical seal for the expanding bolt 14. This bolt 14 has a threaded end 15, an unthreaded shank portion 16 of less diameter than the bore 3 so as not to block the bore, and has a conical shaped expanding head 17 provided with a plurality of grooves 18 forming passageways through the device communicating with the interior bore 3.

Figure 6:
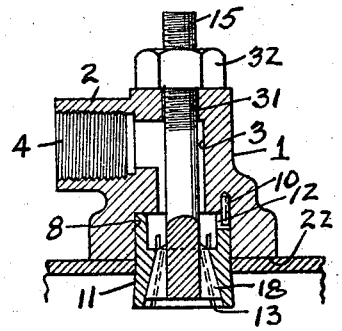

The wall connecting end of the coupling is formed with a projecting shoulder 20, as shown in Figs. 1 and 2, to receive a cup-shaped washer 21 for use on curved surfaces or walls, or is formed with a flat surface 22, as shown in Fig. 6, for use on flat walls where no washer is needed. The curvature of the meeting face 25 of the washer is formed on a diameter smaller than that of the surfaces to which the coupling is to be attached, thus providing a tight fit when the coupling is drawn tightly against the surface. The washer is preferably formed of a soft metal which will easily accommodate itself to the wall surface.

The present device is secured in place in the wall of a receptacle by first drilling a hole 30 therein of a size to receive the expanding sleeve 11, which will be made in various lengths so as to extend through and beyond the inner face of the wall. The coupling is assembled and pushed into place, care being taken to have the grooves 18 spaced away from the slots 13 of the sleeve, the conical head of the bolt thus sealing these slots. The threaded end of the bolt extends through the aperture 31 in the top of the coupling and a nut 32 is employed which draws the bolt head up into the expanding cylinder to expand the latter. As the sleeve expands, it increases in diameter inside of the vessel wall and thus pulls the coupling tight against the exterior of the wall and makes a tight seal between the wall and coupling, or the washer if one is employed.

By preventing the sleeve from rotating, the bolt is held firmly against rotation as the frictional contact between the bolt head and cylinder is sufficient to prevent relative rotation therebetween. The sharp edges along the grooves also bite into the sleeve and aid in preventing rotation of the bolt. The present device is thus simple and easy to manufacture and install, the coupling member proper being made of a standard size and a series of expanding sleeves being used for various wall thicknesses. It is easily installed and tightens itself securely in place and draws down tightly against the wall surface or the washer. The washers may be cupped so as to fit either a spherical or a flat surface or may be shaped to fit a cylindrical or other curved surface without need of making spherically shaped coupling members.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an expansion coupling, the combination of a hollow member having an enlarged bore at the bottom, an expanding sleeve fitting in said enlarged bore and an expanding bolt having a grooved conical head mounted in said sleeve and having its end extending through said member and a nut for engagement with the end of said bolt to draw the latter to expand said sleeve.

2. In an expansion coupling, the combination of a hollow member having an enlarged bore at the bottom, a split expanding sleeve removably mounted in said bore and extending outwardly of said member, and an expanding bolt having a grooved conical head mounted through said sleeve and member and a nut mounted on said bolt and adapted to draw said bolt into said sleeve to expand the latter.

3. In an expansion coupling, the combination of a hollow member having an enlarged bore at the bottom, a split expanding sleeve removably mounted in said bore and extending outwardly of said member, an expanding bolt having a grooved conical head mounted through said sleeve and member, a nut mounted on said bolt and adapted to draw said bolt into said sleeve to expand the latter, and engaging means on said sleeve and member to prevent relative rotation therebetween.

4. In an expansion coupling, the combination of a hollow member having an enlarged bore at the bottom, a split expanding sleeve removably mounted in said bore and extending outwardly of said member, an expanding bolt having a grooved conical head mounted through said sleeve and member, a nut mounted on said bolt and adapted to draw said bolt into said sleeve to expand the latter, said member being formed at the bottom with a depending annular shoulder, and a cupped washer mounted about said shoulder.

5. In an expansion coupling, the combination of a hollow member having a threaded boss for a pipe connection and having an enlarged bore and an annular shoulder at one end, a split expanding sleeve removably mounted in said enlarged bore, an expanding bolt having a grooved head adapted to engage in said sleeve and extend through said member, and a nut for said bolt adapted to draw said bolt into said expanding sleeve.

6. In an expansion coupling, the combination of a hollow member having a threaded boss for a pipe connection and having an enlarged bore and an annular shoulder at one end, a split expanding sleeve removably mounted in said enlarged bore, means on said sleeve and member to prevent relative rotation therebetween, an expanding bolt having a grooved head adapted to engage in said sleeve and extend through said member, and a nut for said bolt adapted to draw said bolt into said expanding sleeve.

7. In an expansion coupling, the combination of a hollow member having a threaded boss for a pipe connection and having an enlarged bore and an annular shoulder at one end, a split expanding sleeve removably mounted in said enlarged bore, an expanding bolt having a grooved head adapted to engage in said sleeve and extend through said member, a nut for said bolt adapted to draw said bolt into said expanding sleeve and a soft metal washer mounted around said shoulder and of greater thickness than said shoulder to form a seal with the engaged surface.

8. In an expansion coupling, the combination of a hollow member having a threaded boss for a pipe connection and having an enlarged bore and an annular shoulder at one end, a split expanding sleeve removably mounted in said enlarged bore, an expanding bolt having a grooved head adapted to engage in said sleeve and extend through said member, a nut for said bolt adapted to draw said bolt into said expanding sleeve, and a soft metal washer mounted around said shoulder and of greater thickness than said shoulder to form a seal with the engaged surface, said sleeve extending beyond said shoulder a distance greater than the thickness of the wall to which the coupling is attached.

9. In an expansion coupling, the combination of a hollow member having a threaded boss for a pipe connection and having an enlarged bore and an annular shoulder at one end, a split expanding sleeve removably mounted in said enlarged bore, an expanding bolt having a grooved head adapted to engage in said sleeve and extend through said member, and a nut for said bolt adapted to draw said bolt into said expanding sleeve, said grooves in said bolt head being so spaced as to be out of alignment with the splits in said sleeve so as to seal the latter when the bolt is drawn tight.

10. In an expansion coupling, the combination of a hollow member having a bolt for a pipe connection and having an enlarged bore and an annular shoulder at one end, a split expanding sleeve removably mounted in said enlarged bore, an expanding bolt having a grooved head adapted to engage in said sleeve and extend through said member, a nut for said bolt adapted to draw said bolt into said expanding sleeve and a cupped washer of relatively soft metal mounted about said shoulder and having its curvature on a radius less than that of the surface engaged.

Signed by me this 24th day of September, 1925.

JOHN C. McLEAN.